(12) United States Patent
Boge et al.

(10) Patent No.: US 12,515,860 B2
(45) Date of Patent: Jan. 6, 2026

(54) TAMPER EVIDENT CARD PACKAGE AND METHOD

(71) Applicant: CPI CARD GROUP—MINNESOTA, INC., Roseville, MN (US)

(72) Inventors: Paul William Boge, Mora, MN (US); Michael Leuthard Dewulf, Lakeville, MN (US); Thanh Quang Chu, Coon Rapids, MN (US)

(73) Assignee: CPI CARD GROUP—MINNESOTA, INC., Roseville, MN (US)

( * ) Notice: Subject to any disclaimer, the term of this patent is extended or adjusted under 35 U.S.C. 154(b) by 973 days.

(21) Appl. No.: 16/996,093

(22) Filed: Aug. 18, 2020

(65) Prior Publication Data

US 2022/0055814 A1 Feb. 24, 2022

(51) Int. Cl.
*B65D 73/00* (2006.01)
*B29C 65/00* (2006.01)
*B29C 65/04* (2006.01)
*B29C 65/78* (2006.01)
*B29L 31/00* (2006.01)

(52) U.S. Cl.
CPC .......... *B65D 73/0078* (2013.01); *B29C 65/04* (2013.01); *B29C 65/7802* (2013.01); *B29C 66/1122* (2013.01); *B29C 66/4332* (2013.01); *B29C 66/851* (2013.01); *B29L 2031/7164* (2013.01); *B65D 2401/00* (2020.05)

(58) Field of Classification Search
CPC .......................... B65D 2575/36; B65D 75/36; B65D 73/0078; B65D 73/0085; B29C 65/04; B29C 65/7802; B65B 11/52; B65B 9/045
See application file for complete search history.

(56) References Cited

U.S. PATENT DOCUMENTS

| | | | | | |
|---|---|---|---|---|---|
| 3,062,366 | A | * | 11/1962 | Palmer | B65D 73/0092 206/443 |
| 3,960,309 | A | * | 6/1976 | Hazel | H05K 13/06 29/850 |
| 4,119,203 | A | * | 10/1978 | Kuchenbecker | B65D 75/368 206/467 |
| 5,038,936 | A | * | 8/1991 | Borst | B65D 75/366 206/771 |
| 5,353,935 | A | * | 10/1994 | Yeager | B65D 75/366 206/815 |
| 5,379,572 | A | * | 1/1995 | Giovannone | B29C 66/91411 53/329.3 |
| 5,404,693 | A | * | 4/1995 | Giovannone | B65B 51/10 53/478 |
| 5,509,773 | A | * | 4/1996 | Connor | B65B 69/0058 414/412 |

(Continued)

*Primary Examiner* — Daniel I Walsh
(74) *Attorney, Agent, or Firm* — Dorsey & Whitney LLP

(57) ABSTRACT

A tamper evident card package includes a first portion comprising plastic polymer and defining a cavity extending from a base surface of the first portion. A second portion comprises a flat sheet of plastic polymer joined to the first at a seal extending around an entirety of a perimeter of the tamper evident card package, where the first portion and the second portion form a unitary structure at the seal. An insert contained between the first portion and the second portion includes a point-of-sale activated card and machine readable activation information for the point-of-sale activated card from an exterior of the tamper evident card package.

20 Claims, 12 Drawing Sheets

(56) References Cited

U.S. PATENT DOCUMENTS

| | | | | |
|---|---|---|---|---|
| 5,803,260 A * | 9/1998 | Tilton | B65D 75/36 | 206/463 |
| 5,863,414 A * | 1/1999 | Tilton | B65D 73/0092 | 206/778 |
| 5,884,456 A * | 3/1999 | Hansen | B65B 11/50 | 53/477 |
| 5,927,500 A * | 7/1999 | Godfrey | B65D 83/0463 | 206/532 |
| 5,941,375 A * | 8/1999 | Kamens | A45C 11/182 | 150/147 |
| 6,016,914 A * | 1/2000 | Gustafson | B65D 75/366 | 206/467 |
| 6,604,342 B1 * | 8/2003 | Appelbaum | B65B 11/50 | 53/374.8 |
| 7,017,513 B2 * | 3/2006 | Giewercer | G09F 11/23 | 116/319 |
| 7,255,230 B1 * | 8/2007 | Appelbaum | B65D 75/366 | 206/463 |
| 7,779,614 B1 * | 8/2010 | McGonagle | B65B 5/103 | 53/238 |
| 10,248,816 B2 * | 4/2019 | Tang | B65B 51/32 | |
| 10,410,019 B2 * | 9/2019 | Tang | B65B 13/185 | |
| 2002/0088736 A1 * | 7/2002 | Liu | B65D 25/107 | 206/526 |
| 2002/0088855 A1 * | 7/2002 | Hodes | B65D 73/0028 | 235/385 |
| 2003/0004889 A1 * | 1/2003 | Fiala | G07F 7/025 | 705/64 |
| 2003/0090049 A1 * | 5/2003 | Hill | B65H 39/14 | 270/32 |
| 2003/0196925 A1 * | 10/2003 | Dalessandro | B65D 75/36 | 206/461 |
| 2006/0060578 A1 * | 3/2006 | Church | B65D 43/021 | 220/326 |
| 2007/0023884 A1 * | 2/2007 | Branzell | B65D 77/20 | 257/679 |
| 2008/0059228 A1 * | 3/2008 | Bossi | G16H 30/20 | 705/2 |
| 2009/0038274 A1 * | 2/2009 | Cash, III | B65B 43/44 | 53/493 |
| 2009/0038977 A1 * | 2/2009 | Tilton | B65D 73/0057 | 53/485 |
| 2009/0091123 A1 * | 4/2009 | Conley | B65D 73/0078 | 283/106 |
| 2009/0101534 A1 * | 4/2009 | Wills | A61J 1/035 | 53/396 |
| 2009/0139186 A1 * | 6/2009 | Alexander, Jr. | B29C 66/841 | 53/373.7 |
| 2009/0145090 A1 * | 6/2009 | Vassigh | B65D 75/22 | 220/795 |
| 2010/0219099 A1 * | 9/2010 | Schmitt | B65D 75/54 | 206/39 |
| 2010/0251666 A1 * | 10/2010 | Gonzalez | B65B 59/04 | 53/201 |
| 2010/0280152 A1 * | 11/2010 | Barhouse | C08L 67/02 | 264/210.1 |
| 2011/0079529 A1 * | 4/2011 | Appelbaum | B65D 73/0057 | 206/462 |
| 2011/0091705 A1 * | 4/2011 | Shih | C08L 67/02 | 264/491 |
| 2011/0233097 A1 * | 9/2011 | Clark | B65D 75/366 | 493/56 |
| 2011/0253737 A1 * | 10/2011 | Portney | A61J 7/0076 | 221/277 |
| 2011/0278192 A1 * | 11/2011 | Thornton | B65D 73/0092 | 206/464 |
| 2012/0012491 A1 * | 1/2012 | Wade | B65D 73/0092 | 53/485 |
| 2012/0031908 A1 * | 2/2012 | Ludwig | B29C 65/7882 | 220/378 |
| 2012/0085671 A1 * | 4/2012 | Wade | B65D 73/0092 | 206/469 |
| 2012/0187026 A1 * | 7/2012 | Nazari | B65D 73/0092 | 206/778 |
| 2012/0234909 A1 * | 9/2012 | Tang | B65B 11/50 | 235/375 |
| 2012/0256006 A1 * | 10/2012 | Schmitt | B65D 75/566 | 235/487 |
| 2013/0228488 A1 * | 9/2013 | Wu | B65D 83/04 | 493/52 |
| 2014/0209498 A1 * | 7/2014 | Stevens | B41J 29/38 | 358/1.6 |
| 2014/0262906 A1 * | 9/2014 | Le | B65D 83/0463 | 206/461 |
| 2014/0291189 A1 * | 10/2014 | Morgan | B65D 73/0092 | 206/459.5 |
| 2015/0164741 A1 * | 6/2015 | Wilson | A61J 7/02 | 53/448 |
| 2015/0210455 A1 * | 7/2015 | Tillstrom | B65B 51/02 | 206/460 |
| 2016/0202290 A1 * | 7/2016 | Kim | G01R 31/2893 | 324/750.25 |
| 2016/0244198 A1 * | 8/2016 | Doherty | B65D 73/0092 | |
| 2018/0018479 A1 * | 1/2018 | Tang | B65B 35/18 | |
| 2018/0265270 A1 * | 9/2018 | McClaughry | B65D 5/20 | |
| 2020/0140170 A1 * | 5/2020 | Kooc | B65D 73/0085 | |
| 2021/0292067 A1 * | 9/2021 | Rosenbrien | B31B 50/82 | |
| 2021/0300655 A1 * | 9/2021 | Zeanah | B65D 73/0092 | |
| 2022/0055814 A1 * | 2/2022 | Boge | B29C 66/4332 | |
| 2022/0242608 A1 * | 8/2022 | Green | B65D 5/4208 | |
| 2022/0339955 A1 * | 10/2022 | Dickman | B42D 15/045 | |
| 2023/0138334 A1 * | 5/2023 | Holmes | B65B 5/06 | 53/52 |
| 2024/0269080 A1 * | 8/2024 | Bradbury | B33Y 30/00 | |

\* cited by examiner

TAMPER EVIDENT CARD PACKAGE AND METHOD

BACKGROUND

Point of sale activated transaction cards, such as gift cards, debit cards, and credit cards are widely used. Point of sale activated transaction cards may be printed and then at the point of sale (such as a retail store), the cards are activated with a balance selected by the consumer. Typically, cards may be stored or displayed in an inactivated or voided state to prevent theft, e.g., without a balance or without being activated. However, monetary balances linked to cards may still be stolen. For example, a thief may remove a card from its packaging long enough to obtain identifying card data such as an account number or activation code, after which the card is returned to its packaging. When the card is activated through purchase, the stole identifying card data may be used to access value associated with the card. Current technologies for packaging point of sale transaction cards make such theft difficult to identify.

Some packaging, including plastic packaging, includes small openings where thieves may access the transaction cards before placing the cards back into the packaging. Similarly, where an adhesive is used to bond two portions of a package together, adhesives may be dissolved or otherwise deactivated to gain access to the transaction cards inside a package. In some instances, small gaps are left in packaging due to a need for locating features on one or more portions of packaging to ensure that pre formed openings (e.g., openings for hang tags) on different portions of packaging align before the portions are joined together. Some locating features prevent the formation of a seal around an entire perimeter of packaging.

Many packages including point of sale transaction cards may include multiple cards in one package, where one card is visible. In these instances, activation of the visible card may activate other cards in the package. During packaging of the transaction cards, the cards may be placed in incorrect packages or in an incorrect configuration, such that, when the cards are purchased, all cards in the package are not properly activated for use.

SUMMARY

The present disclosure provides a tamper evident card package for point of sale activated transaction cards. An example tamper evident card package includes a first portion comprising plastic polymer and including a cavity and a second portion comprising a flat sheet of plastic polymer joined to the first portion at a seal extending around at an entirety of a perimeter of the tamper evident card package, where the first portion and the second portion form a unitary structure at the seal. An insert is contained between the first portion and the second portion and comprises a point-of-sale activated card and machine readable activation information for the point-of-sale activated card visible from an exterior of the tamper evident card package.

The present disclosure provides construction of a tamper evident card package. A first portion is located on tooling using a locator formed in the first portion. An insert is placed in the locator of the first portion, where the insert includes a point-of-sale activated card and machine readable activation information for the point-of-sale activated card. Contents of the insert are verified by determining that the machine readable activation information corresponds to the point-of-sale activated card. A second portion is bonded to the first portion using RF sealing such that the insert is enclosed by the bond between the first portion and the second portion and the machine readable activation information is visible from an exterior surface of the second portion.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

Figure 1:
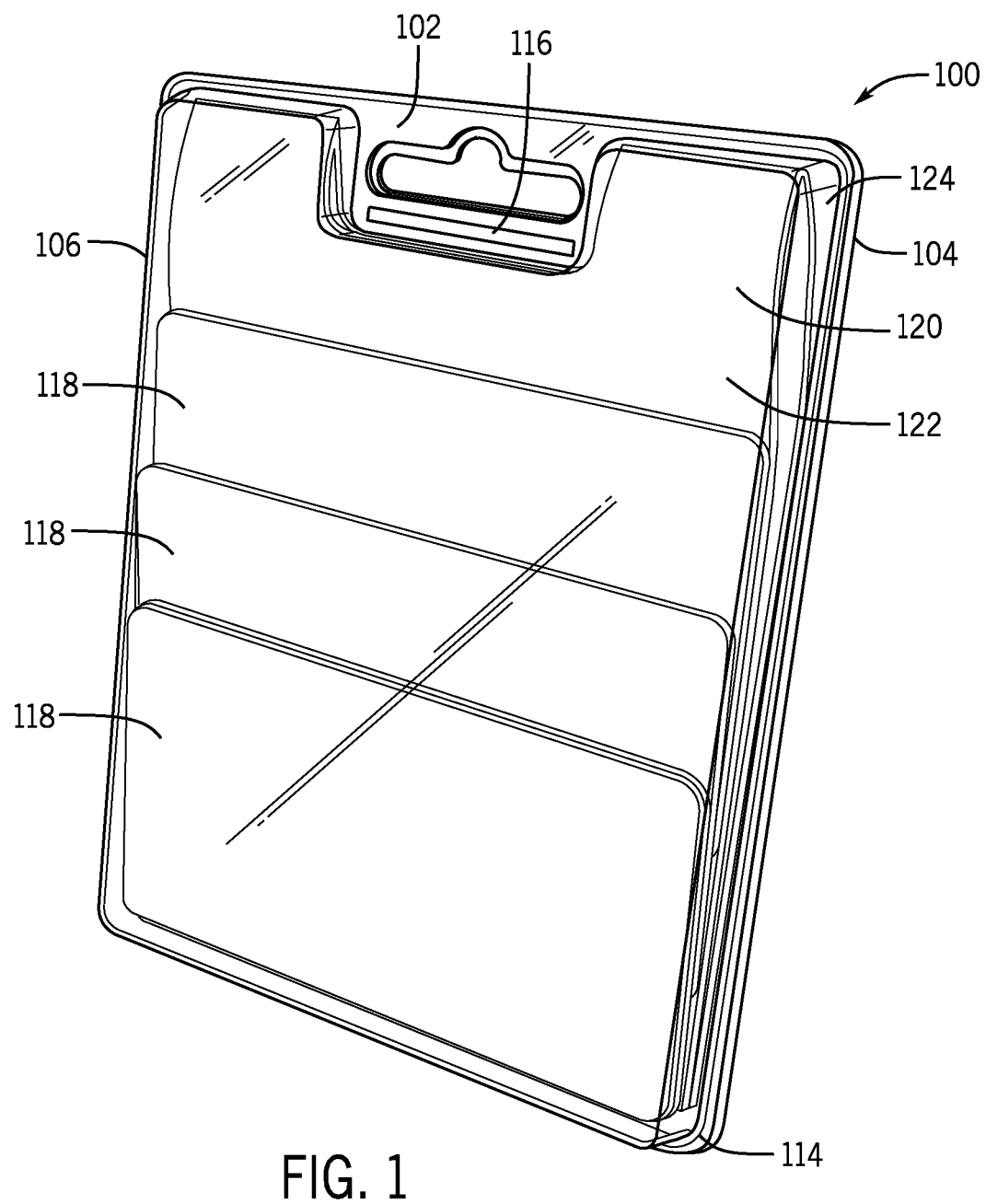
FIG. 1 illustrates an example tamper evident card package.

A tamper evident card package is disclosed that prevents undetectable access to enclosed cards. For example, the tamper evident card package will need to be irreparably or visibly damaged in order to access the interior, preventing inadvertent activation of a compromised card. In other words, to access the interior of the packaging, a would be thief would be unable to repair the package or otherwise make such a small access cut so as to make the package look as if the card had not been tampered with. In this manner, the tamper evident card package helps to prevent the theft of point of sale (POS) transaction items, such as cards, since any tampering or theft will be readily identifiable. For example, the tamper evident card package may make it virtually impossible to remove a card from the package without irreparably damaging one or both portions of the package.

A tamper evident card as described herein may include two portions joined together by a tamper evident seal. The seal does not include an adhesive between the two portions, which could be dissolved or deactivated to access transaction cards in the packaging. Rather, the seal bonds the two portions of the packaging together at a molecular level, such that the portions must be partially destroyed (either at the seal location or elsewhere) to access the internal cavity defined by the two portions. In some implementations, the seal may be formed by radio frequency (RF) sealing or welding. In these implementations, the seal integrates the two portions together as to act as a unitary structure, making temporary access to the internal cavity impossible without damage to one of the two portions.

Further, some embodiments of the tamper evident card packaging may include a cavity that can act as a locating feature during manufacturing. The cavity locating feature allows a seal to extend around the entire perimeter of the packaging, significantly increasing the difficulty of accessing transaction cards in the packaging undetected. In other words, the seal may not include gaps, discontinuity portions, or areas with weakness, such that the internal cavity may not be easily accessed, regardless of the area of access. In conventional POS card packages, often the seal included gaps along the perimeter, allowing an entry point for access to the internal cavity.

Embodiments of a method of manufacturing the tamper evident card package may include visual verification of cards placed in packaging to prevent ineffective card activation. For example, identifiers associated with separate cards within multiple card packages may be imaged and cross-checked against information regarding which of the multiple cards activates the remaining cards before the packaging is sealed. The visual identification or registration allows for verification before cards are sealed into packages, such that errors may be corrected without the need to create an additional package. Further, the visual verification reduces the production and sale of card packages where one or more of the cards in the package are not properly activated at the point of sale.

FIG. 1 illustrates a tamper evident card package 100 in accordance with one embodiment. The package 100 includes a first portion 102 including a cavity 106 sealed to a second portion 104, which may be a flat portion. Transaction cards 118 and an optional insert 120 are contained within the cavity 106 and a seal 114 extends around the entire perimeter of the first portion 102 and the second portion 104. When the first portion 102 is sealed to the second portion 104 a first hanging aperture 108 in the first portion 102 aligns with a second hanging aperture 110 in the second portion 104. A seal 116 located near the hanging apertures 108, 110 prevents access to the cavity 106 through the hanging apertures 108, 110. Transactions cards 118 included in the package 100 may be, for example, point-of-sale activated gift cards, credit or debit cards, or any other type of stored value card or transaction item.

Figure 2:
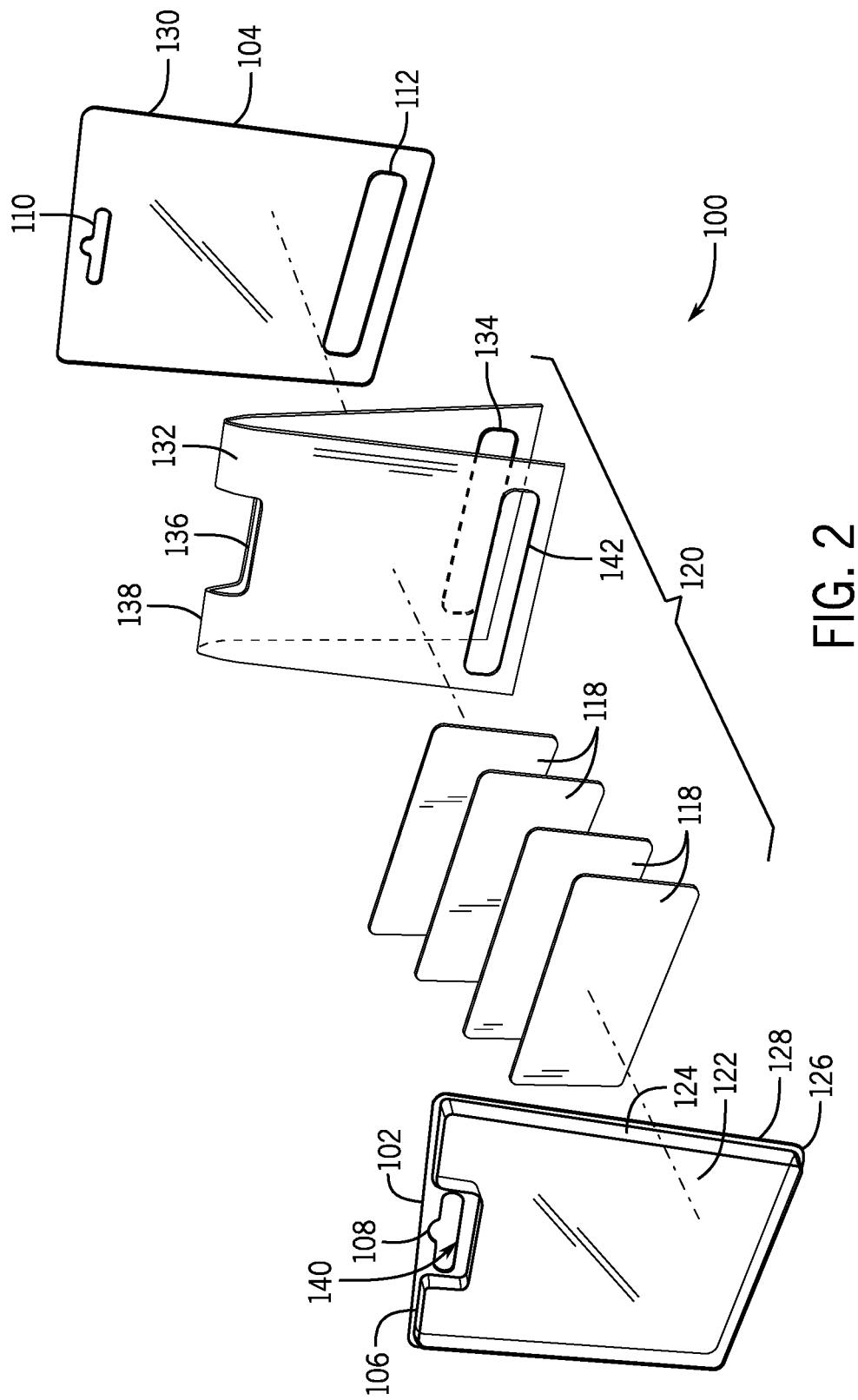
FIG. 2 illustrates an exploded view of the example tamper evident card package of FIG. 1.

With reference to FIG. 2, the first portion 102 may be generally rectangular in shape and include rounded corners. In some implementations, the first portion 102 may be, for example, square, rectangular without rounded corners, circular, oval, or an irregular shape. The portion 102 may be formed of a plastic polymer, such as polyvinyl chloride (PVC), polyethylene, or polypropylene.

The first portion 102 is formed to include the cavity or blister 106 that acts to define a recessed or extended pocket or the like for the first portion 102. For example, the first portion 102 may be thermoformed to define the cavity 106. The cavity 106 may be defined by a substantially flat exterior surface 122 and a side wall 124 extending between the exterior surface 122 and a base surface 126 of the first portion 102. The base surface 126 forms a lip extending around the blister or cavity 106. Where the base surface 126 defines a first elevation, the cavity 106 extends from the base surface 126 to a second elevation defined by the exterior surface 122. The exterior surface 122 is connected to the base surface 126 by the side wall 124.

An edge 128 of the base surface 126 defines a perimeter of the first portion 102. The base surface 126 is generally flat. In the example portion 100 shown in FIG. 2, on three sides of the edge 128, the base surface 126 has a substantially constant width measured from the side wall 124 to the edge 128. On the fourth side of the edge 128, the base surface 126 varies in width from the side wall 124 to the edge 128 to accommodate the hanging aperture 108 cut through the base surface 126. The hanging aperture 108 may be an oval with a semi-circular notch, as shown in FIG. 2, or may be, for example, circular, oval-shaped, or rectangular.

In some implementations, the exterior surface 122 may be slightly curved or may include protruding features such that the exterior surface 122 is not substantially flat. The cavity 106 may be shaped to accommodate additional features of the packaging 100, such as the hanging aperture 108. For example, as shown in FIG. 2, the cavity 106 is generally rectangular in shape but includes a variation to define a notch region 140 of the base surface 126 to accommodate the hanging aperture 108. The notch region 140 may be, for example, a rectangular notch extending into the perimeter of the cavity 106. Further, the cavity 106 may substantially follow or correspond to the shape of the first portion 102 as a whole (e.g., a rectangular cavity 106 and a rectangular first portion 102, as shown in FIG. 2) or may be shaped differently from the first portion 102 as whole (e.g., an oval-shaped cavity 106 and a rectangular first portion 102).

Figure 5A:
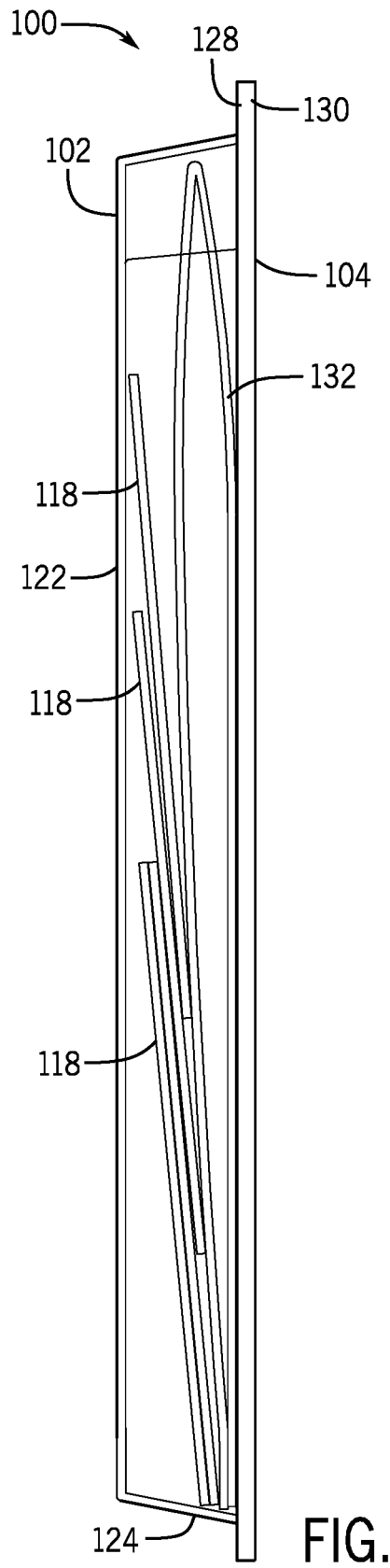
FIG. 5A illustrates a side view of the example tamper evident card package of FIG. 1.

The second back portion 104 generally has the perimeter shape as the first front portion 102, such that an edge 130 of the second portion 104 is substantially even with the edge 128 of the first portion 102 when the second portion 104 is joined to the first portion 102. For example, FIG. 5A shows the edge 130 even with the edge 128. Accordingly, the second portion 104 may be any shape described above with respect to the first portion 102. Further, the second portion 104 generally comprises a plastic polymer, as described above with respect to the first portion 102.

With reference to FIG. 2, the portion 104 may be generally flat and includes a hanging aperture 110 and an access opening 112, which may be, in one example, die cut through the second portion 104. The hanging aperture 110 may be any of the shapes described above with respect to the hanging aperture 108 in the first portion 102. The access opening 112 may be rectangular, oval, or another shape allowing viewing of machine-readable card activation information through the access opening 112. In some implementations, the second portion 104 may not include an access opening 112 or a hanging aperture 110.

The insert 120 is generally located between the first portion 102 and the second portion 104 and includes at least one transaction card 118. In some implementations, such as the package 100 shown in FIG. 2, the insert 120 includes multiple transaction cards 118 and support 132. In some implementations, for additional security, a third seal may be included between layers of the support 132 to enclose the transaction card 118 within the support 132. The third seal may be created by an adhesive or may be created by, for example, RF welding. In one implementation, for example, the insert 120 may be formed from an ultrasecure card package including heat sealed panels surrounding transaction cards. For example, the ultrasecure card package described in U.S. patent application Ser. No. 16/879,573, filed May 20, 2020, entitled "Ultrasecure Card Package," may be placed between the first portion 102 and the second portion 104.

Figure 4:
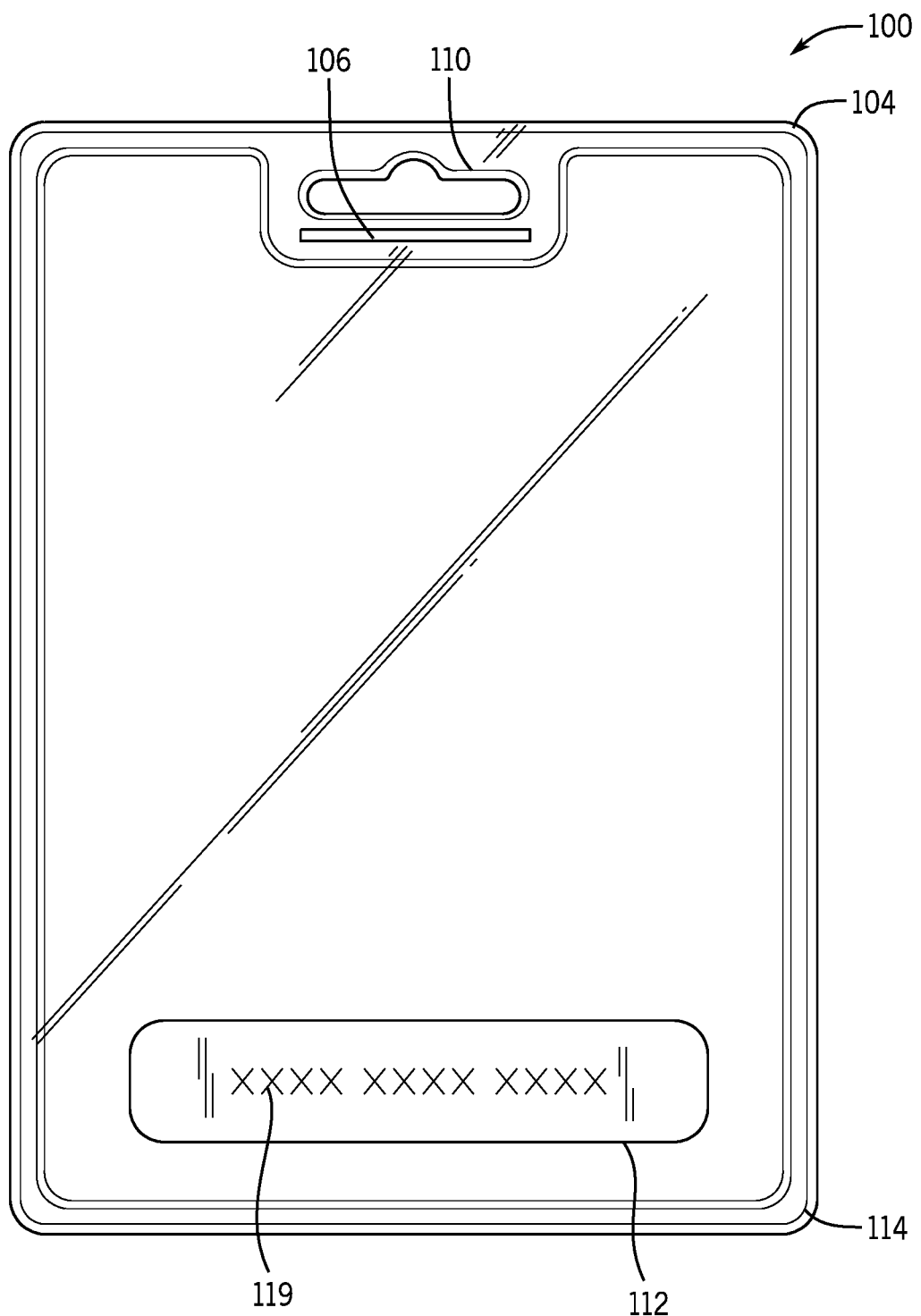
FIG. 4 illustrates a plan view of the example tamper evident card package of FIG. 1.

The transaction card 118 may include a point-of-sale activated gift card, credit or debit card, or any other type of stored value card. The transaction card 118 may be activated by activating machine readable activation information (e.g., a barcode, QR code, or other scannable code) viewable from an exterior of the packaging 100. In some implementations, machine readable activation information may be printed or located on the transaction card 118. In other implementations, the machine readable activation information 119 may be printed on an additional insert component visible from an exterior of the packaging, as shown in FIG. 4.

In some implementations, such as the insert 120 shown in FIG. 2, the insert 120 may include multiple transaction cards 118. In these implementations, one of the transaction cards 118 (e.g., the parent card) may include machine readable activation information that, when read by a machine (e.g., scanned at a store checkout), activates each of the transaction cards 118 in the insert 120. In some implementations, machine readable activation information may be located on a separate portion of the insert 120 viewable from the exterior of the package 100 and such machine readable activation information may activate each of the transaction cards 118 in the insert 120.

A support 132 may be made of a bleached paperboard substrate and may be coated or treated to improve printability and durability. The support may also be formed from plastic or other materials as desired. The support 132 may include access openings 134, 142, and a hanging aperture 136. The access openings 134 and 142 may be generally rectangular, oval, or another shape allowing viewing of machine readable activation information through the opening (e.g., when activation information is located on a transaction card). In some implementations, card activation information for the transaction cards 118 may be printed on the support 132, and the support may not include the access openings 134 and 142. The access openings 134 and 142 may be located such that when the support 132 is folded along a fold line 138, the access openings 134 and 142 align. The hanging aperture 136 may be generally rectangular in shape and centered along the fold line 138 of the support 132, such that, when the support 132 is folded along the fold line 138, edges of the hanging aperture 136 meet. Further, the support 132 may be dimensioned such that a length of the support 132 is double a length of the blister 106 such that the support 132 fits within the blister 106 in two layers when folded along the fold line 138.

In some implementations, the support 132 may not include a fold line 138 and may, instead, be one layer of material fitting within the dimensions of the cavity 106. In these implementations, the opening 136 may be a notch along the top edge of the support 132.

The transaction cards 118 may be coupled (e.g., adhered) to the support 132 using a removable adhesive, such that machine readable activation information is aligned with the openings 142 and 134. In some implementations, the transaction cards 118 may be covered by the support (e.g., between the two portions of the support created by the fold line 138. Further, in some implementations, additional materials, such as terms and conditions for the transaction cards 118 may be included in the insert 120 between the two portions of the support 132.

To form the package 100, the insert 120 is placed between the first portion 102 and the second portion 104, and the first portion 102 is sealed, joined, welded, fused, or otherwise attached to the second portion 104. As shown in FIG. 1, when the insert 120 is placed in the cavity 106 of the first portion 102, the hanging aperture 136 in the support 132 aligns with the notch 140 of the cavity 106. Where, as in the example package 100, transaction cards 118 are adhered to the support 132, the transaction cards 118 may be visible through the exterior surface 122 of the first portion 102. With reference to FIG. 4, when the package 100 is assembled, the access openings 134 and 142 in the support 132 may align with the access opening 112 in the second portion 104 such that machine readable activation information 119 for the transaction cards 118 may be viewed through the access opening 112. Further, when the package 100 is formed the hanging aperture 108 of the first portion 102 and the hanging aperture 110 of the second portion 104 align to form an opening through both the base surface 126 of the first portion 102 and the second portion 104.

Figure 3:
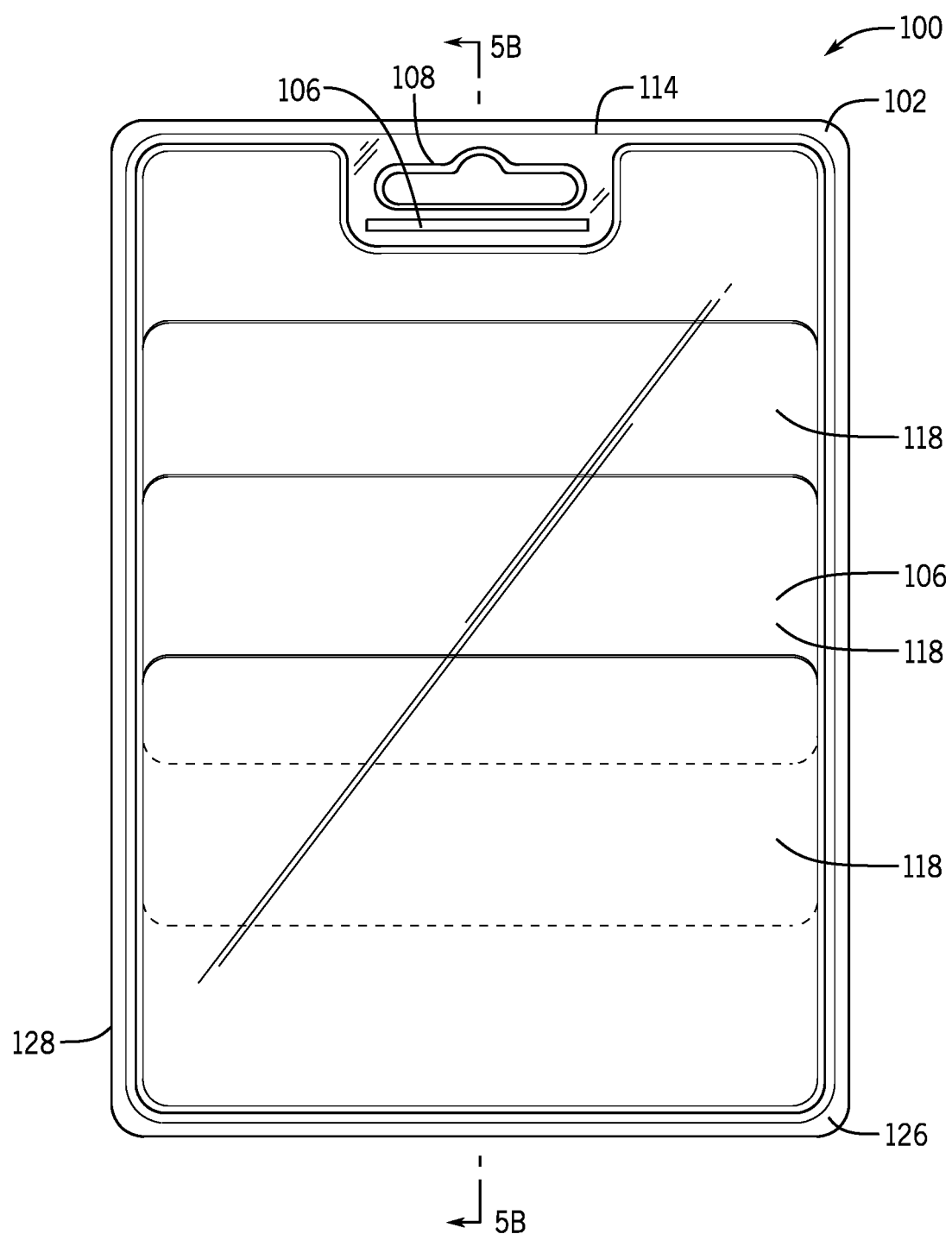
FIG. 3 illustrates a plan view of the example tamper evident card package of FIG. 1.

With reference to FIG. 3, the first portion 102 is joined to the second portion 104 by perimeter seal 114 and notch seal 116. In some implementations, the perimeter seal 114 may extend to the edges 128 and 130 of the portions 102 and 104. The perimeter seal 114 joins the base surface 126 of the first portion 102 and the second portion 104 such that the perimeter seal 114 encloses the cavity 106 and extends around the entire perimeter of the package 100. The perimeter seal 114 may, in some implementations, be wide enough to create a larger unitary structure between the first portion 102 and the second portion 104, making breaking and/or penetrating the seal more difficult. For example, the perimeter seal 114 may, at any given point along the perimeter, have a width having a minimum dimension of 1/16" and in some instances may extend to 1/8" or longer, where the seal structure extends perpendicular to the edges 128 and 130 of the portions 102 and 104. In other words, the seal 114 may extend along a length of the package, from an interior point (e.g., a point on the first or second portions or the package itself) outwards towards the outer edge (e.g., outer perimeter edge of the package, first portion, and/or second portion), to define the width at various locations of the seal. In these instances, the seal may be sufficiently wide to prevent unnoticeable damage if penetrated as it requires more structure to be damaged during the opening. Further, the additional width, as compared to conventional seals, may provide enhanced rigidity and structure to the package.

As the seal extends around the entire perimeter, there are no openings through which to access the insert 120 between the edge 128 of the first portion 102 and the edge 130 of the second portion 104. Further, the notch seal 116 joins the base surface 126 to the second portion 104 between the cavity 106 and the hanging aperture 108 in the second portion 102. Without the notch seal 116, where the hanging aperture 108 and the hanging aperture 110 align, the first portion 102 would not be bonded to the second portion 104 and there would be access to the insert 120 in the cavity 106. The notch seal 116 closes the opening and access point to the cavity 106 created by the hanging apertures 108 and 110. The notch seal 116 may, be parallel to a portion of the perimeter seal 114 but separate from the perimeter seal 114 as shown, for example, in FIG. 4. In other implementations, the notch seal 116 may be contiguous with the perimeter seal 114 such that the notch seal 116 branches off of the perimeter seal 114.

Figure 5B:
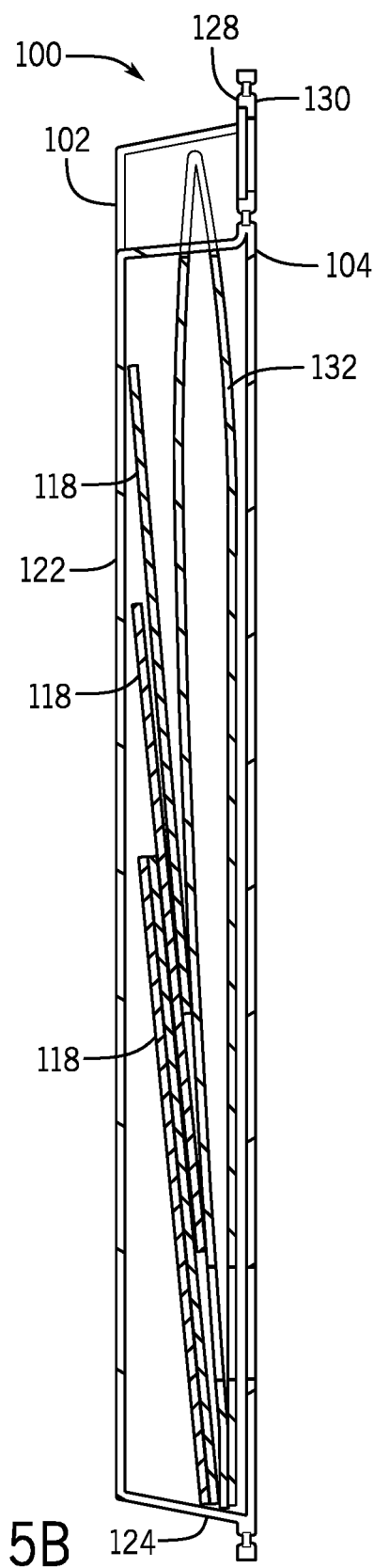
FIG. 5B illustrates a section view, taken along section line 5B-5B of FIG. 3, of the example tamper evident card package of FIG. 1.

With reference to FIG. 5B, the first portion 102 and the second portion 104 form a unitary structure at the seals 114 and 116 and are in direct contact (e.g., no adhesive is present between the portions 102 and 104) at the seals 114 and 116. For example, creation of the seals 114 and 116 may melt the portions 102 and 104 together at the seals 114 and 116 such that, when cooled, the portions 102 and 104 form a unitary structure where no clear delineation exists between the first portion 102 and the second portion 104. Further, as shown in FIG. 5B, during formation, the seals 114 and 116 may compress the material of the first portion 102 and the second portion 104, leading to an indentation at the seals 114 and 116 relative to the base surface 126 of the first portion and the flat surface of the second portion 104.

Figure 6:
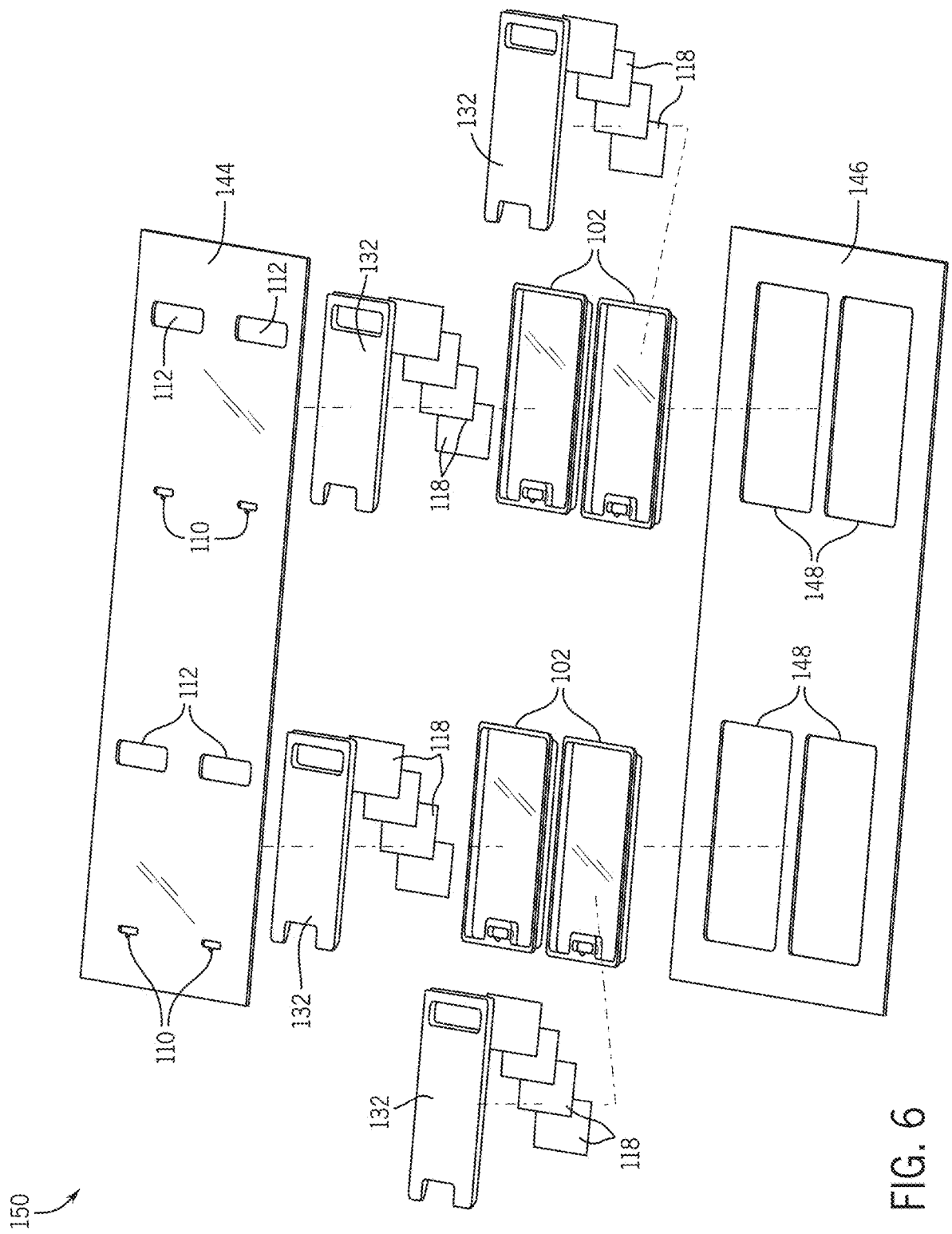
FIG. 6 illustrates an example exploded view of construction of multiple tamper evident card packages.

FIG. 6 shows example tooling 150 that may be used when coupling first portions 102 and second portions 104 together to create packages 100. During the sealing process, multiple first portions 102 may be placed on a metallic plate 146. As shown, a plastic polymer sheet 144 is sealed to each of the multiple first portions 102, and the sheet 144 is then cut or separated to form the second portions 104 of the individual packages 100. Because the sheet 144 includes pre-cut portions to form the hanging aperture 110 and the access opening 112 of the second portions 104, the sheet 144 can more easily align with the first portions 102 to create the packages 100 (e.g., so that the hanging apertures 110 align with the hanging apertures 108). Further, in some implementations, the sealing process requires an exact location of the first portions 102.

Locator features are generally used to align the first portions 102 on the plate 146. In the implementation shown in FIG. 6, the cavities 106 act as locators, aligning with openings 148 in the plate 146. Accordingly, when the first portions 102 are located on the plate 146, the cavities of the first portion 102 extend into the openings 148 and the base surfaces 126 of the first portions 102 are positioned on the plate 146 so that the base surfaces 126 have surface area exposed so as to be coupled via the sealing method to sheet 144. The openings 148 may accommodate blister portions 102 with cavities of varying depths (e.g., for packages holding one transaction card or multiple transaction cards). Accordingly, the plate 146 may be used in manufacture of different configurations of packaging.

Figure 7A:
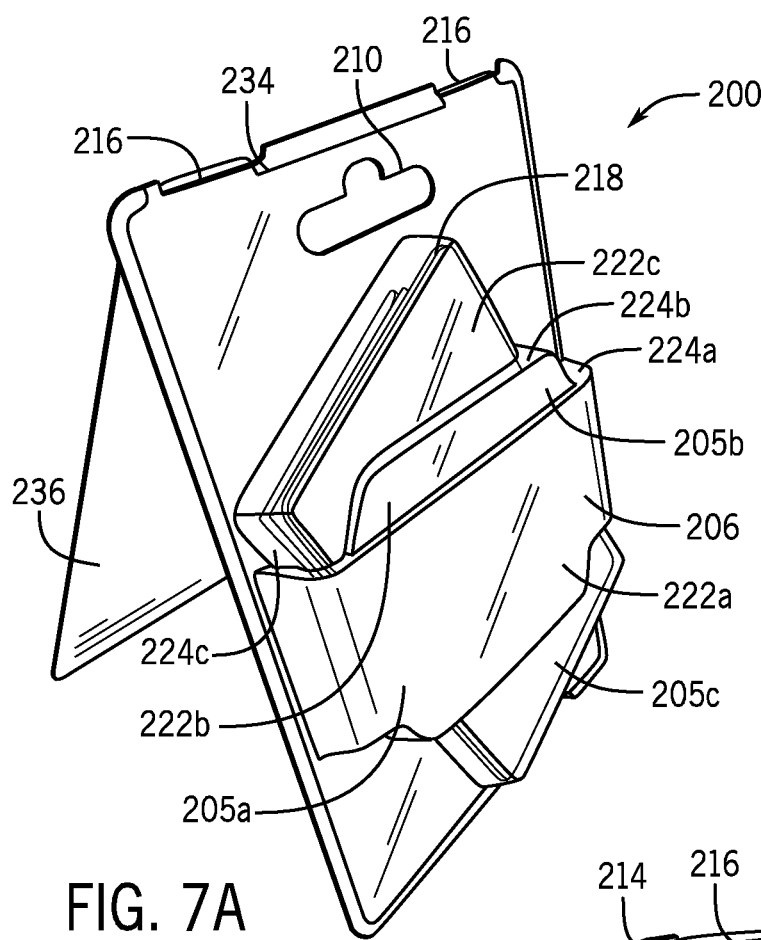
FIG. 7A illustrates an example tamper evident card package.

Another implementation of a tamper evident card package 200 is shown in FIGS. 7A-10 is formed by a first portion 202 joined to a second portion 204 with an insert 220 contained between the portions 202 and 204. With reference to FIG. 7A, the package 200 includes an exterior portion 236 of support 232 and includes locators (e.g., locators 212 and 216) formed in the edges 228 and 230 of the portions 202 and 204, respectively.

Figure 8:
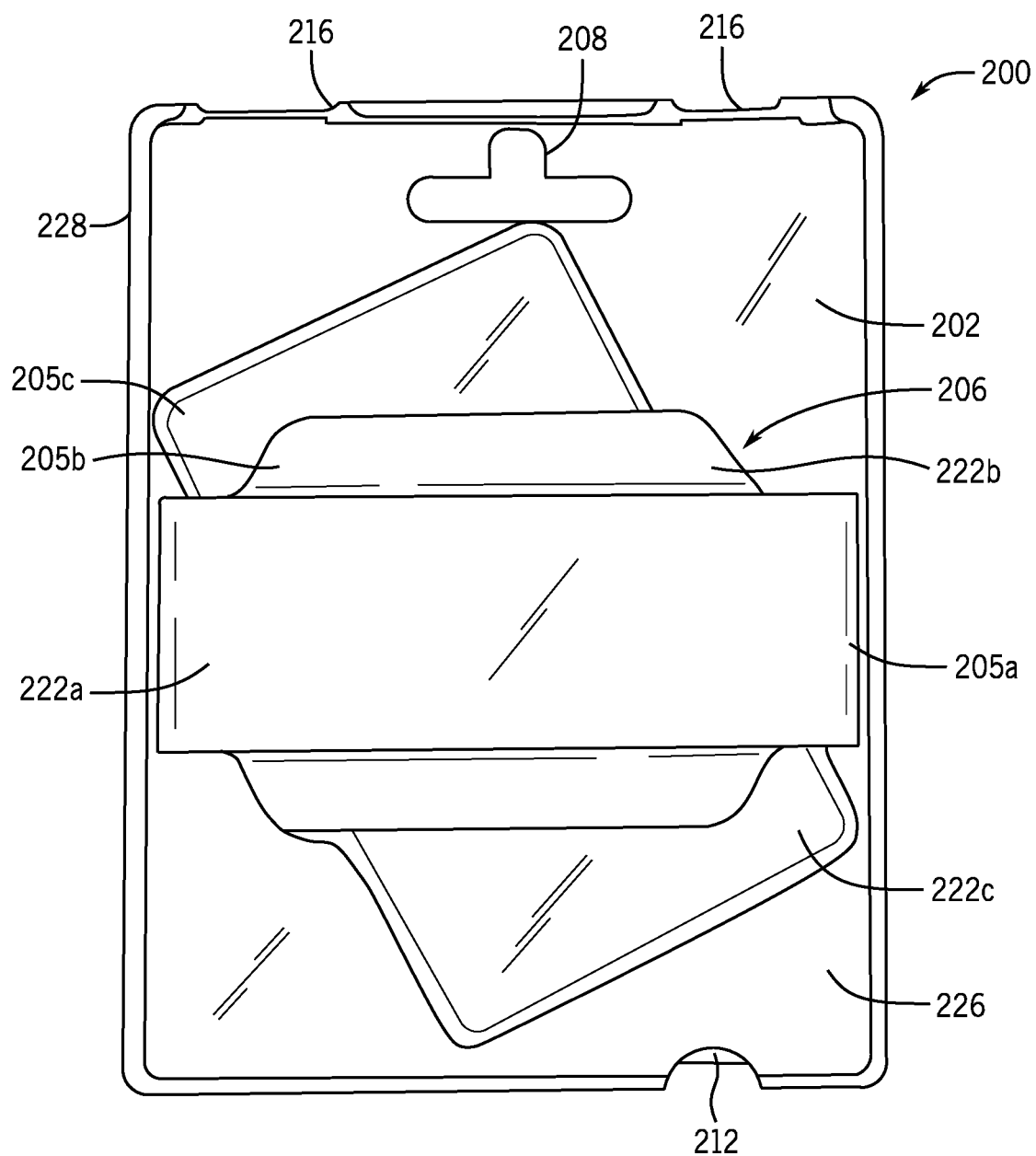
FIG. 8 illustrates a plan view of the example tamper evident card package of FIG. 7A.

The first portion 202 may be made from similar materials and using similar methods as those described above with respect to the first portion 102. With reference to FIG. 8, the first portion 202 includes a hanging aperture 208, which may be a similar shape and location on the first portion 202 as the hanging aperture 108 formed in the first portion 102. The edge 228 of the first portion 202 defines a shape of the first portion 202, which may be, for example, rectangular, square, oval, circular, or any irregular or regular polygon. The edge 228 includes notches 216 in one side and a locator 212 in another side. The notches 216 may be generally curved and located on either side of the hanging aperture 208. The locator 212 shown in FIG. 8 is generally semi-circular and located along a bottom portion of the edge 228, though other shapes and locations are contemplated.

Figure 7B:
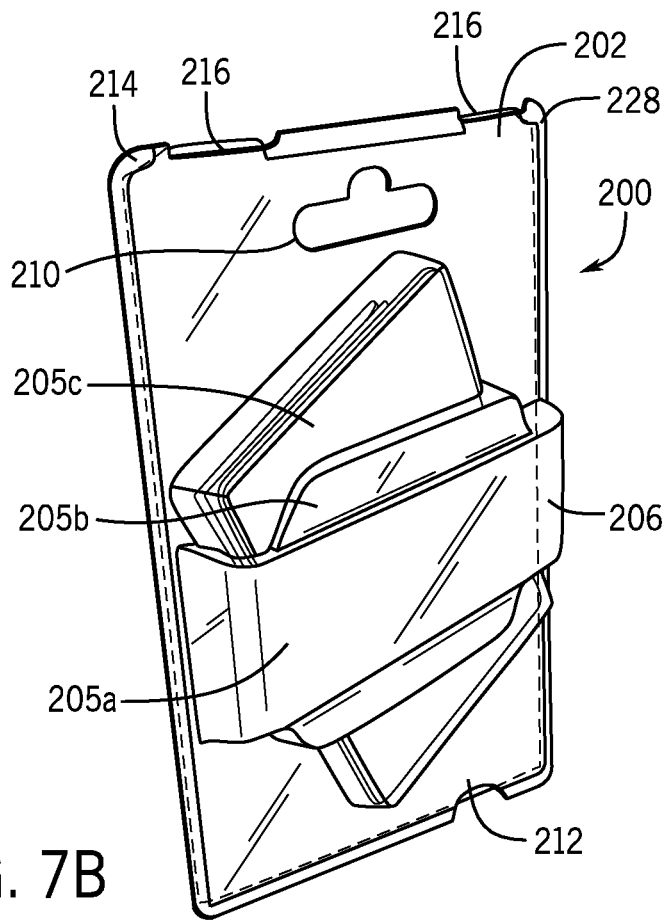
FIG. 7B illustrates the tamper evident card package shown in FIG. 7A.

Like the first portion 102, the first portion 202 includes a base surface 226 and a cavity 206 raised up or otherwise extending away from the first portion 202. For example, the cavity 206 may be formed as a blister or pocket that extends either inwards or outwards from the base surface 226. The cavity 206 shown, for example in FIG. 8 includes discrete sections 205a, 205b, and 205c, each being defined by an exterior surface 222a, 222b, and 222c and side walls 224a, 224b, and 224c, respectively. The side walls 224a, 224b, and 224c define the depth of the cavity 206 and a distance between the base surface 226 and the exterior surfaces 222a, 222b, and 222c, respectively. With reference to FIG. 7B, the sections 205a, 205b, and 205c have different shapes and different depths relative to the base surface 226. For example, the section 205a is generally rectangular in shape and has the shallowest depth relative to the base surface 226 of the sections 205a, 205b, and 205c. In other implementations, more or fewer sections of the same or differing shapes may comprise the cavity 206. Generally, the cavity 206 includes some portion shaped to include one or more transaction cards 218.

Figure 9:
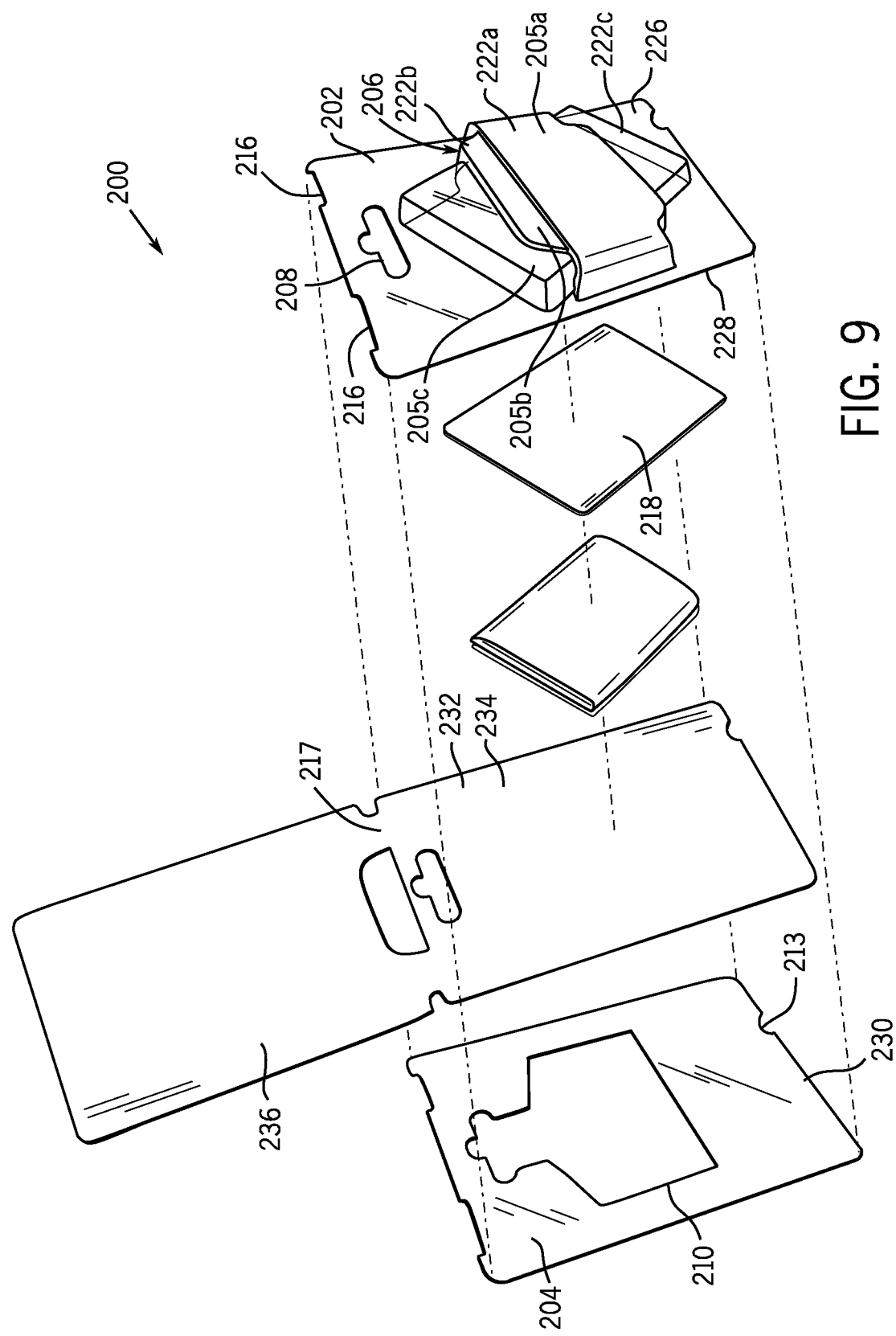
FIG. 9 illustrates an exploded view of the example tamper evident card package of FIG. 7A.
Figure 10:
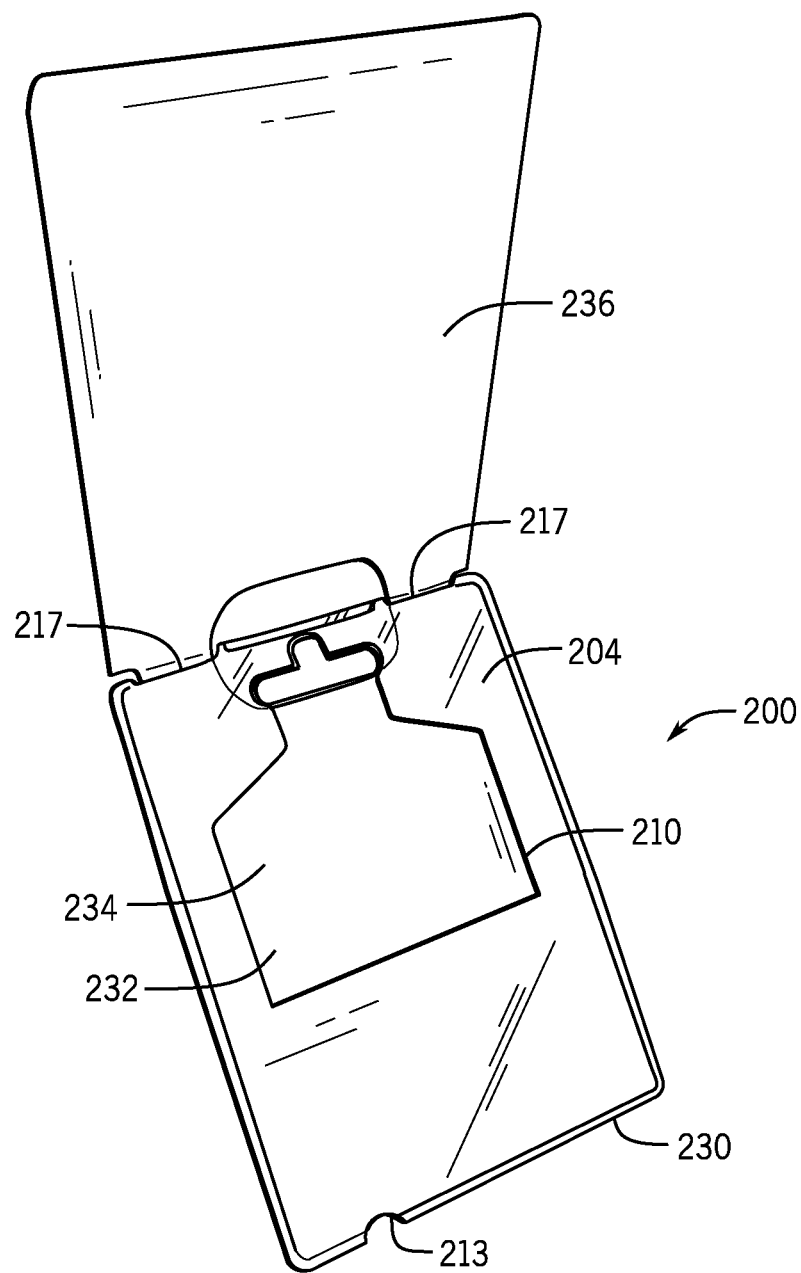
FIG. 10 illustrates a rear perspective view of the example tamper evident card package of FIG. 7A.

With reference to FIGS. 9 and 10, the second portion 204 is generally flat and includes a hanging aperture 210. The second portion 204 may be made from any plastic polymer material, including those discussed with respect to the portions 102, 104, and 202. The hanging aperture 210 generally includes at least one area overlapping with the hanging aperture 208 in the first portion 202. The hanging apertures 208 and 210 may be the same or different shapes. For example, both the hanging apertures 208 and 210 may be rectangular with a semicircular cutout that can receive a rod or a hook. Alternative, the hanging aperture 208 may be rectangular with a semicircular cutout and the hanging aperture 210 may be rectangular. The shape of the second portion 204 is defined by an edge 230 and may include any of the shapes described with respect to the portions 104 or 202. A locator 213 and notches 217 are located along the edge 230 of the portion 204. The locator 213 may be of a similar shape and location relative to the second portion 204 as the locator 212 described with respect to the first portion 202. Similarly, the notches 217 may be of a similar shape and location relative to the second portion 204 as the notches 216 described with respect to the first portion 202.

An insert of the package 200 may include support 232, one or more transaction cards 218, and other components, such as terms and conditions. The transaction cards 218 may any of the types of transaction cards described above with respect to the transaction cards 118. The support 232 may be a similar material and finish as the support 132. With reference to FIGS. 9 and 10, The support 232 includes an interior portion 234 and an exterior portion 236, separated by a fold line 238. An opening 240 may be located symmetrically along the fold line 238, similar to the opening 140 described above with respect to the support 132. The support 232 may be printed on one or both sides and may include machine readable activation information for the transaction card 218 located inside of the packaging 200. To form the insert, one or more transaction cards 218 may be adhered to the support 232. In other implementations, each component of the insert may be separate (e.g., not joined by an adhesive).

The assembled package 200 retains one or more transaction cards 218 between the first portion 202 and the second portion 204. With reference to FIG. 7A, the transaction card 218 may be placed in the cavity 206, which may be the section 205c of the cavity 206. In some implementations, multiple transaction cards 218 may be placed within the cavity 206. Additional components, such as card terms and conditions, contracts, advertisements, or other information may also be retained in the cavity 206.

With continued reference to FIG. 7A, the interior portion 234 of the support 232 is also retained between the portions 202 and 204. In some implementations, the interior portion 234 of the support 232 may be located such that the transaction card 218 is enclosed between the interior portion 234 of the support 232 and the first portion 202. When the package 200 is assembled, the fold line 238 may align with openings 242 formed by the notches 216 and 217 of the portions 202 and 204. The exterior portion 236 of the support 232 is then external to the portions 202 and 204 and, as shown in FIG. 7A and FIG. 9, may be movable about the fold line 238 with respect to the second portion 204. In implementations where transaction cards 218 are contained between the support 232 and the first portion 202 and the support 232 does not include any openings for viewing of the transaction cards 218, machine readable activation information for the transaction cards may be printed on either portion of the support 232 or, in some implementations, on the second portion 204.

The perimeter seal 214 is similar to the perimeter seal 114 in that the perimeter seal 214 secures the first portion 202 to the second portion 204 and the portions 202 and 204 form a unitary structure at the perimeter seal 214 without adhesive located between the portions 202 and 204. The seal 214 is also located proximate to the edges 228 and 230 of the portions 202 and 204, such that a portion of the perimeter of the package 200 is the perimeter seal 214. The perimeter seal 214 does not seal the portions 202 and 204 together at the locators 212 and 213 or the notches 216 and 217. However, due to the location of the paperboard 232 and the size of the locators 212 and 213 and the notches 216 and 217, the transaction cards 218 cannot be accessed without either destroying the perimeter seal 214 or destroying the support 232, both of which would provide obvious visual indications of tampering.

Figure 11:
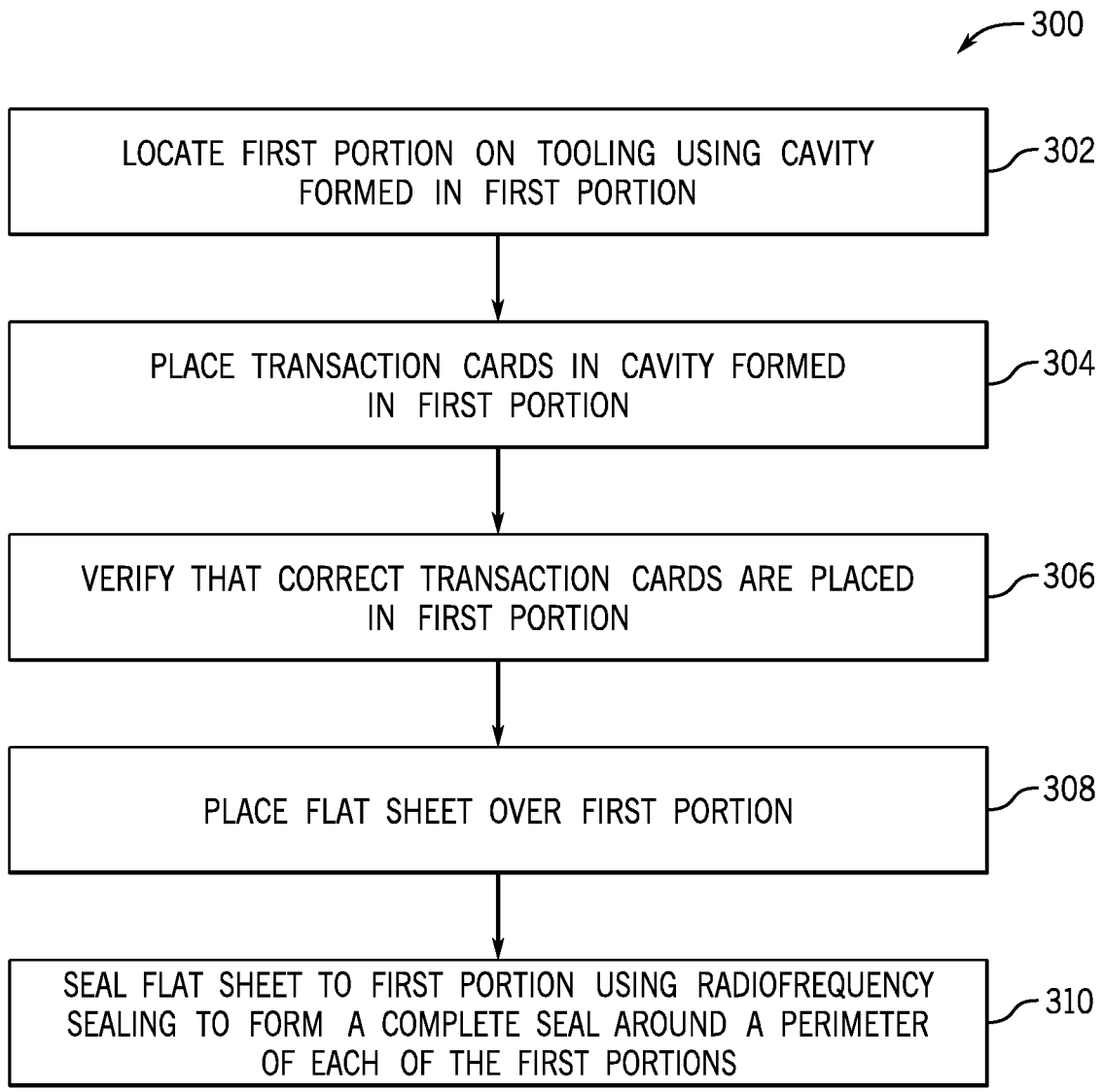
FIG. 11 illustrates an example method for constructing a tamper evident card package.

FIG. 11 illustrates an example method 300 for constructing a tamper evident card package 100 in accordance with one embodiment. Prior to the steps of the method 300, the first portions 102 and a sheet 144 (or second portions 104) may be formed. For example, the first portions 102 may be thermoformed to form cavities 106 and die cut to form the perimeter 128 and the hanging aperture 108. For example, a flat plastic polymer material may be heat treated around a mold to deform the material into a desired shape (e.g., the shape of the blister portion 102). Similarly, the sheet 144 may be die-cut to form the hanging apertures 110 and access openings 112 located in the second portions 104. In some implementations, either or both of the portions 102 and 104 may be printed prior to the method 300.

A locating operation 302 locates packaging portions on the tooling 150 using cavities formed in the packaging portions. For example, as shown in FIG. 6, blister portions 102 may be placed on the plate 146 by placing the blisters 106 of the blister portions 102 in the openings 148 in the plate 146. The base surfaces 126 of the blister portions 102 are then resting on the plate 146. The openings 148 in the plate 146 may be sized to receive the blisters 106 of the blister portions 102, such that the blister portions 102 remain in place on the plate 146 when the blisters 106 are retained in the openings 148. For example, the openings 148 may be sized to match the dimensions of the blisters 106. When a portion 102 is placed on the plate 146, the blister 106 extends through the opening 148 and the base surface 126 rests on the surface of the plate 146 extending radially outward from the opening 148. Because in many embodiments, the openings 148 are complete openings through the plate 146, rather than just recesses, the same openings may accommodate blister portions 102 with blisters 106 of varying depths, as long as the blister perimeter is sized to fit within the openings 148. However, in other embodiments, the openings may be formed as recesses rather than holes or full openings.

A placing operation 304 places a transaction card in blisters 106 formed in the blister portions 102. In some implementations, the placing operation 304 may place additional materials (e.g., support 132 and other components of the insert 120) into blisters (e.g., cavities 106) of blister portions 102. In some implementations, multiple transaction cards 118 are placed into each cavity 106 during placing operation 304. In implementations where inserts 120 are placed in the cavities 106, the inserts 120 may be pre-assembled before the placing operation 304. For example, transaction cards 118 may be adhered to the support 132 to form an insert 120 which is placed in a cavity 106 during the placing operation 304.

The placing operation 304 may place transaction cards 118 and/or an insert 120 in the cavity 106 such that any machine readable activation information 119 is visible when looking into the cavity 106. For example, the insert 120 shown in FIG. 5B is placed such that the transaction cards 118, attached to a first portion of the support 132 are visible through the exterior surface 122 of the cavity 106 and the second portion of the support 132 including the access opening 134 faces away from the external surface 122 of the cavity 106. Accordingly, machine readable activation information visible through access openings 134 and 142 of the support 132 is visible from above the plate 146, as shown in FIG. 6.

A verifying operation 306 verifies that correct transaction cards are placed in packaging portions. In implementations where multiple transaction cards 118 are placed in the cavity 106, the verifying operation 306 may verify that the machine readable activation information matches all transaction cards 118 placed in the cavity. For example, the verifying operation 306 may compare card identification information (e.g., account numbers, card numbers, or access codes) for each of the transaction cards 118 to the machine readable activation information. The machine readable activation information may be located on one of the transaction cards 118 or on another location within the insert 120, such as the support 132. In implementations where one transaction card 118 is placed in the cavity 106, the verifying operation 306 may verify that machine readable activation information printed on the support 132 matches card identification information on the transaction card 118.

For example, during the verifying operation 306, the system may scan the machine readable activation information (e.g., a barcode or QR code) and card identification information (e.g., by taking a photo or video and extracting text from the image). The verifying operation 306 may access data indicating expected card identification information corresponding to the machine readable activation information to ensure that the machine readable activation information visible from outside of the package 100 will activate the transaction cards 118 contained in the package 100.

A placing operation 308 places a flat sheet over the packaging portions. For example, the placing operation 308 places the sheet 144 over the portions 102 on the plate 146. For example, corners of the sheet 144 may be aligned with corners of the plate 146 and a tool element positions the sheet 144 on the plate 146. In some implementations, prior to the placing operation 308, a cutting operation may die cut openings in the sheet 144. For example, hanging apertures 110 and access openings 112 may be cut into the sheet 144 prior to the placing operation 308.

A sealing operation 310 seals the flat sheet to the packaging portions to form a complete seal around a perimeter of each of the packaging portions. The sealing operation 310 may use any type of sealing, welding, or joining that creates a unitary structure at the seals 114 and 116. In one implementation, the blister portion 102 is joined to the backing portion 104 and the blister portion 202 is joined to the backing portion 204 using RF sealing, which may also be referred to as high frequency or RF welding. Generally, RF sealing uses radiofrequency to excite molecules of a plastic polymer, generating heat and fusing two pieces of the plastic polymer together as they cool. The two pieces of plastic polymer are generally held between dies or platens as the RF signal is applied and as the layers cool. In many instances, no adhesive is positioned between the portions sealed using RF sealing. Additionally, the portions form a unitary structure at the seal, as shown, for example, by seals 114 and 116 in FIG. 5B.

When the sealing operation 310 uses RF welding, several variables may be controlled or adjusted before the sealing operation 310 to ensure quality seals 114 and 116. For example, in some implementations, dwell time, sealing time, and/or temperature may be adjusted based on environmental factors, such as the temperature or humidity of the environment. Accordingly, the sealing operation 310 may include measuring environmental factors and adjusting parameters of the RF sealing process based on the measured environmental factors.

In an example sealing operation 310, dies having the shape of seals 114 and 116 are lowered such that the blister portions 102 and the backing portions 104 (or, in some implementations, blister portions 102 and the sheet 144) are held between the dies and the plate 146. While the portions 102 and 104 are held in place, an electric field is applied to the portions 102 and 104. The frequency of the field causes molecules of the materials of the portions 102 and 104 to move, generating heat to weld the portions 102 to the portions 104. The electric field is turned off and the portions 102 and 104 are allowed to cool while the dies remain in place, putting pressure on the cooling portions by pushing against the plate 146. As the portions 102 and 104 cool, liquid polymers diffuse into each other, forming a unitary structure at the seals 114 and 116. Once the portions 102 and 104 are cooled, the packaging 100 may be lifted from the plate 146.

In some implementations, an die cutting operation may separate individual packages 100 after the sealing operation 310. For example, where the portions 104 are formed of a sheet 144 and the sheet 144 is sealed to multiple blister portions 102, the die cutting operation may cut the sheet 144 to form the backing portions 104 and separate individual packages 100 after the sealing operation 310. The packages 100 made using the method 300 include seals 114 around the entire perimeter of the packages 100 and seals 116 under openings for hang tags, meaning that the inserts 120 in the packages 100 are not accessible without destruction of the seals 114 and 116 (e.g., by cutting the seals). As destruction of the seals 114 and 116 would be obvious visually, the packages 100 reduce the ability of thieves to access card identification information and place cards back on shelves to be purchased and activated.

Figure 12:
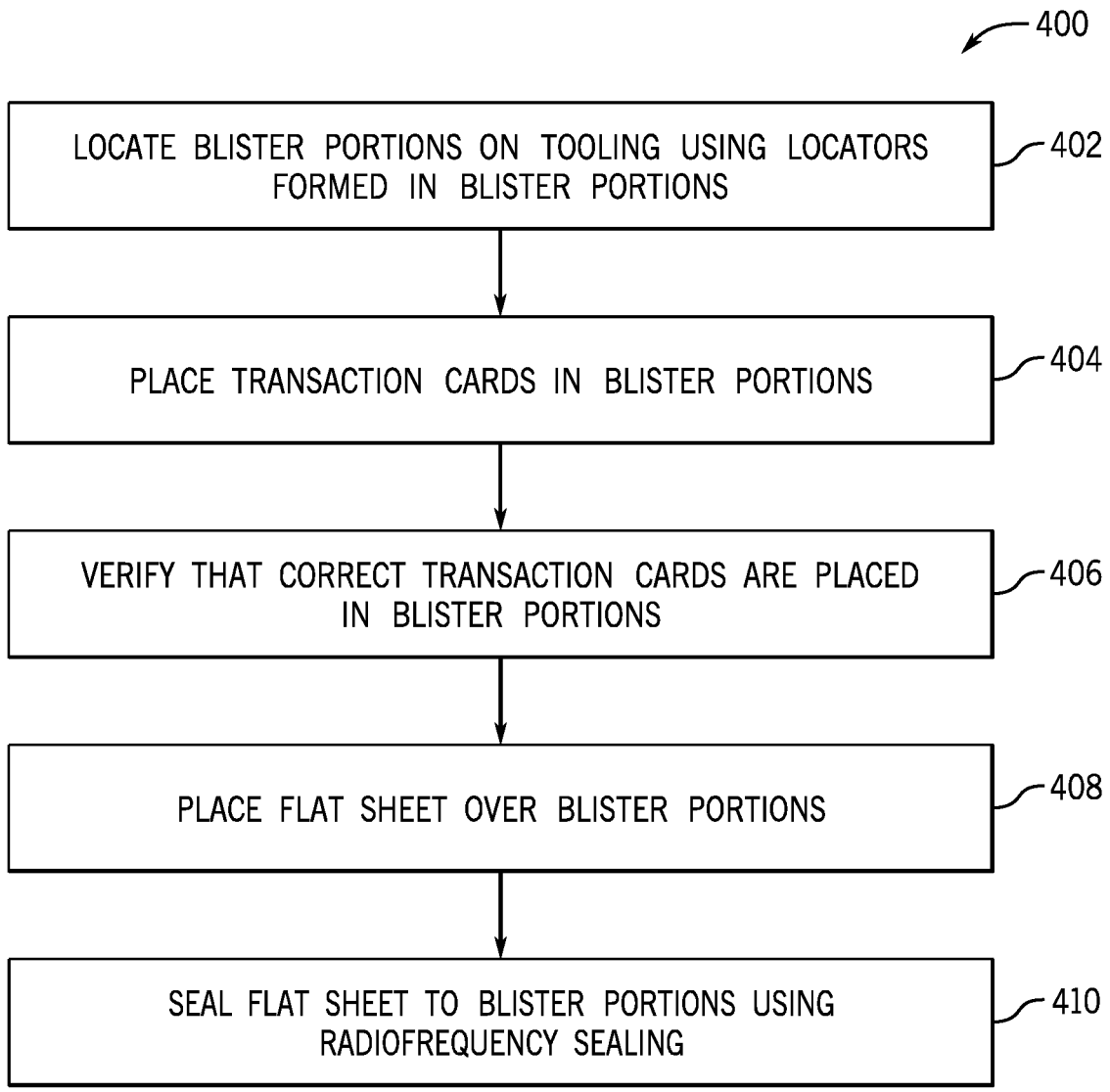
FIG. 12 illustrates an example method for constructing a tamper evident card package.

FIG. 12 illustrates an example method 400 for constructing a tamper evident card package 100 or 200 in accordance with one embodiment. Prior to the steps of the method 400, portions 102, 104, 202, and/or 204 may be formed. For example, blister portions 102 and 202 may be thermoformed to form cavities 106 and 206, respectively. Any of the portions may be die-cut to form the edges and/or any openings in the portions. In some implementations, the portions may be printed on prior to the method 400. Further, as described above, a sheet 144 may be formed prior to construction of the packages 100 in some implementations.

A locating operation 402 locates packaging portions on the tooling 150 using locators formed in the packaging portions. For construction of the package 100, the locating operation 402 may include locating cavities or blisters 106 of the blister portions 102 in openings 148 of the plate 146, as described with respect to the locating operation 302. For construction of the packages 200, locators 213 in the second portion 204 may be used to locate the second portions 204 on a plate or locators 212 in the first portions 202 may be used to locate the first portions 202 on the plate. For example, a plate used in construction of the packages 200 may include protrusions, such as rods or buttons, that fit inside the locators 212 to locate the first portions 202 on the plate. For example, the portions 202 may be correctly placed on the plate when the locators 212 partially encircle rods protruding from the plate with the same diameter as the locators 212.

A placing operation 404 places transaction cards in the packaging portions. For construction of the package 100, the placing operation 404 may be similar to or the same as the placing operation 304. For construction of the package 200, the placing operation may place one or more transaction cards 218 in the blister 206, along with any additional information in the insert. The paperboard 232 may be placed over the first portion 202 in a flat configuration, such that the internal portion 234 and the exterior portion 236 are coplanar and the fold line 238 is generally aligned with the notches 216 in the first portion 202.

A verifying operation 406 verifies that correct transaction cards are places in packaging portions. For construction of the package 100, the verifying operation 406 may be similar to or the same as the verifying operation 306. For construction of the package 200, the verifying operation 406 may occur in parallel with the placing operation 404. For example, card identification information for the transaction cards 218 (e.g., account numbers, codes, etc.) may be visually observed through a camera during the placing operation 404. Machine readable activation information for the transaction cards 218 may then be observed (e.g., visually or by scanning) when the paperboard 232 is placed in the placing operation 404. The verifying operation 406 may then compare the card identification information collected from the transaction cards 218 to card identification information corresponding to the machine readable activation information from the paperboard 232 to ensure that the transaction cards 218 will be activated by the machine readable activation information on the paperboard 232.

A placing operation 408 places one or more sheets over the packaging portions. For construction of the package 100, the placing operation 408 may be similar to or the same as the placing operation 308. For construction of the package 200, the placing operation 408 may place the backing portions 204 over the blister portions 202. In some implementations, a single sheet may be placed over all of the blister portions 202 during the placing operation 408. When the placing operation 408 places the backing portions 204 over the blister portions 202, the locators 214 in the backing portions 204 may be placed relative to locating features on the plate to ensure that the backing portions 204 are aligned with the blister portions 202.

A sealing operation 410 seals the sheets to the packaging portions. For construction of the package 100, the sealing operation 410 may be similar to or the same as the sealing operation 310. For construction of the package 200, the sealing operation 410 may be similar to the sealing operation 310 in that the sealing operation 410 creates a seal 214 around a portion of the perimeter of the package 200 where the blister portion 202 and the backing portion 204 form a unitary structure at the seal 214. Similar tooling and methods of sealing (e.g., RF sealing) may be used in the sealing operation 410 in construction of the packages 200.

As described above with respect to the method 300, in some implementations, additional operations, such as a die cutting operation may be performed after the method 400 to form the packages 100 or 200. Both the packages 100 and 200 include seals around a perimeter of the package, which, in combination with other features of the packages (e.g., paperboard 232 placement or an additional seal 116) protect the transaction cards inside the packages from being accessed without visible destruction of the package.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method of constructing a tamper evident card package comprising:
locating a first portion of the tamper evident card package on a plate using a blister formed in the first portion by aligning the blister with a locating aperture of the plate, wherein the blister and the first portion are a unitary structure forming a single, continuous piece comprised of a first material;
placing an insert in the blister of the first portion, the insert comprising a point-of-sale activated card and machine readable activation information for the point-of-sale activated card;
verifying contents of the insert by checking that the machine readable activation information corresponds to the point-of-sale activated card; and
bonding a second portion of the tamper evident card package directly to the first portion using radiofrequency (RF) sealing such that the insert is contained between the first portion and the second portion by the bond between the first portion and the second portion, an RF seal formed by the bond between the first portion and the second portion extends around an entirety of a perimeter of the tamper evident card package, and the machine readable activation information is visible from an exterior surface of the second portion, wherein there is no adhesive disposed between the first portion and the second portion.

2. The method of claim 1, wherein the first portion and the second portion form a unitary structure at the RF seal.

3. The method of claim 1, wherein the RF seal formed by the bond between the first portion and the second portion has a width of more than 1/16" extending from an interior location of the tamper evident card package to an outer edge of the tamper evident card package.

4. The method of claim 1, wherein locating the first portion on the plate further comprises locating the blister formed in the first portion in a milled portion of the plate.

5. The method of claim 1, wherein the plate is a metallic plate including an opening sized corresponding to the blister formed in the first portion.

6. The method of claim 1, wherein the RF seal created by bonding the first portion to the second portion has a width of more than 1/16" as defined from an interior location of the package to an outer edge of the package.

7. The method of claim 1, wherein:
the plate defines a plurality of milled opening portions;
the first portion is a first portion of a plurality of first portions;
each first portion of the plurality of first portions includes a blister;
locating the first portion on the plate comprises locating the blisters formed in each of the first portions of the plurality of first portions in corresponding milled opening portions of the plurality of milled opening portions.

8. A method of constructing a tamper evident card package comprising:
locating, via a blister formed in a first portion of the tamper evident card package, the first portion on a plate, wherein the blister is placed on the plate by aligning the blister with a locating aperture of the plate;
positioning a point-of-sale activated card and machine readable activation information for the point-of-sale activated card into the blister;
analyzing the machine readable activation information to verify the point-of-sale activated card positioned within the blister; and
bonding a second portion of the tamper evident card package directly to the first portion using radiofrequency (RF) sealing forming a single, continuous piece comprised of a first material, wherein the point-of-sale activated card is captured between the first portion and the second portion and an RF seal free of adhesive and formed by the bond between the first portion and the second portion extends around a perimeter of the tamper evident card package.

9. The method of claim 8, wherein the first portion and the second portion form a unitary structure at the RF seal.

10. The method of claim 8, wherein the machine readable activation information is visible from an exterior surface of the second portion.

11. The method of claim 8, wherein locating the first portion on the plate further comprises locating the blister formed in the first portion in a milled portion of the plate.

12. The method of claim 8, wherein the RF seal extends around an entirety of the perimeter of the tamper evident card package.

13. The method of claim 8, wherein analyzing the machine readable activation information to verify the point-of-sale activated card comprises comparing card identification information for the point-of-sale activated card to the machine readable activation information.

14. The method of claim 13, wherein the identification information includes one or more of an account number corresponding to the point-of-sale activated card, a card number corresponding to the point-of-sale activated card, or an access code corresponding to the point-of-sale activated card.

15. A method of constructing a tamper evident card package comprising:
    locating a first portion of the tamper evident card package on a plate by aligning a blister that forms a unitary structure with the first portion with a locating aperture of the plate, wherein the first portion and the blister form a single, continuous piece comprised of a first material, wherein the first portion is placed on the plate and the blister extends through the plate with edges of the blister extending through and contacting the plate;
    placing an insert in the blister of the first portion, the insert comprising a point-of-sale activated card and machine readable activation information for the point-of-sale activated card;
    verifying contents of the insert by checking that the machine readable activation information corresponds to the point-of-sale activated card; and
    bonding a second portion of the tamper evident card package directly to the first portion using radiofrequency (RF) sealing such that an RF seal is formed by the bond between the first portion and the second portion and the insert is contained between the first portion and the second portion by the bond between the first portion and the second portion, and the machine readable activation information is visible from an exterior surface of the second portion, wherein there is no adhesive disposed between the first portion and the second portion.

16. The method of claim 15, wherein the first portion and the second portion form a unitary structure at the RF seal.

17. The method of claim 15, wherein the RF seal extends around the perimeter of the tamper evident card package.

18. The method of claim 15, wherein locating the first portion on the plate further comprises locating the blister formed in the first portion in a milled portion of the plate.

19. The method of claim 15, wherein verifying contents of the insert by checking that the machine readable activation information corresponds to the point-of-sale activated card comprises confirming identification information for the point-of-sale activated card matches the machine readable activation information.

20. The method of claim 19, wherein the identification information includes one or more of an account number corresponding to the point-of-sale activated card, a card number corresponding to the point-of-sale activated card, or an access code corresponding to the point-of-sale activated card.

* * * * *